United States Patent
Kim et al.

(10) Patent No.: US 7,496,079 B2
(45) Date of Patent: Feb. 24, 2009

(54) APPARATUS AND METHOD FOR TRANSMITTING AND RECEIVING DATA IN A CDMA MOBILE COMMUNICATION SYSTEM

(75) Inventors: Noh-Sun Kim, Taejonkwangyok-shi (KR); Yong-Suk Moon, Songnam-shi (KR); Hun-Kee Kim, Seoul (KR); Jae-Seung Yoon, Songnam-shi (KR)

(73) Assignee: Samsung Electronics Co., Ltd (KR)

( * ) Notice: Subject to any disclaimer, the term of this patent is extended or adjusted under 35 U.S.C. 154(b) by 1304 days.

(21) Appl. No.: 10/183,824

(22) Filed: Jun. 27, 2002

(65) Prior Publication Data
US 2003/0007476 A1    Jan. 9, 2003

(30) Foreign Application Priority Data
Jun. 27, 2001    (KR) ............................... 2001-41405

(51) Int. Cl.
*H04B 7/216* (2006.01)
(52) U.S. Cl. ...................................... 370/342
(58) Field of Classification Search ................ 370/342, 370/335, 320, 441, 227, 210, 208; 714/758, 714/800; 341/50; 375/130
See application file for complete search history.

(56) References Cited

U.S. PATENT DOCUMENTS

| | | | | |
|---|---|---|---|---|
| 4,796,282 A | * | 1/1989 | Yoshida | ...................... 375/368 |
| 6,427,219 B1 | * | 7/2002 | Yang | .......................... 714/758 |
| 6,476,734 B2 | * | 11/2002 | Jeong et al. | .................... 341/50 |
| 7,110,351 B2 | * | 9/2006 | Steer et al. | .................. 370/208 |
| 7,127,661 B2 | * | 10/2006 | Yoon et al. | ................... 714/774 |

OTHER PUBLICATIONS

Panasonic: "Enhanced HARQ Method With Signal Constellation Rearrengement", TSG-RAN Working Group 1, Meeting #19, Feb. 27-Mar. 2, 2001.
Samsung Electronics Co.: "Enhanced Symbol Mapping Method for the Modulation of Turbo-Coded Bits Based on Bit Priority", 3GPPP TSG RAN WG1/WG2 Joint Meeting on HSDPA, Apr. 5-6, 2001.
M.P. Schmitt, Hybrid ARQ Scheme Employing TCM and Packet Combining, Electronics Letters, Sep. 3, 1998, vol. 34, No. 18, pp. 1725-1726.

* cited by examiner

*Primary Examiner*—Chi H Pham
*Assistant Examiner*—Alexander Boakye
(74) *Attorney, Agent, or Firm*—The Farrell Law Firm, PC

(57) ABSTRACT

Disclosed is a data transmission/reception apparatus and method for minimizing decoding errors during high-speed packet transmission in a CDMA mobile communication system. When retransmitting data in the Hybrid Automatic Repeat Request ("H-ARQ") technique, the data transmission/reception apparatus and method performs symbol mapping on coded bits to be retransmitted by allocating different reliabilities to the coded bits according to the number of retransmissions, thus resulting in an improvement of system performance.

32 Claims, 11 Drawing Sheets

FIG. 2
(PRIOR ART)

| | H part | | L part | | H part | | L part | |
|---|---|---|---|---|---|---|---|---|
| Bit 1 | Bit 2 | Bit 3 | Bit 4 | Bit 5 | Bit 6 | Bit 7 | Bit 8 | Bit 9 | Bit 10 | Bit 11 | Bit 12 |

INITIAL TRANSMISSION

| Bit 12 | Bit 1 | Bit 2 | Bit 3 | Bit 4 | Bit 5 | Bit 6 | Bit 7 | Bit 8 | Bit 9 | Bit 10 | Bit 11 |

1ST RETRANSMISSION

| Bit 11 | Bit 12 | Bit 1 | Bit 2 | Bit 3 | Bit 4 | Bit 5 | Bit 6 | Bit 7 | Bit 8 | Bit 9 | Bit 10 |

2ND RETRANSMISSION

| Bit 10 | Bit 11 | Bit 12 | Bit 1 | Bit 2 | Bit 3 | Bit 4 | Bit 5 | Bit 6 | Bit 7 | Bit 8 | Bit 9 |

3RD RETRANSMISSION

FIG. 8

APPARATUS AND METHOD FOR TRANSMITTING AND RECEIVING DATA IN A CDMA MOBILE COMMUNICATION SYSTEM

PRIORITY

This application claims priority to an application entitled "Apparatus and Method for Transmitting and Receiving Data in a CDMA Mobile Communication System" filed in the Korean Industrial Property Office on Jun. 27, 2001 and assigned Serial No. 2001-41405, the contents of which are hereby incorporated by reference.

BACKGROUND OF THE INVENTION

1. Field of the Invention

The present invention relates generally to an apparatus and method for transmitting and receiving data in a CDMA mobile communication system, and in particular, to a data transmission/reception apparatus and method for adjusting reliabilities of data bits mapped to a modulated symbol before transmission.

2. Description of the Related Art

In a communication system, transmission signals are invariably mixed with some kind of distortion and noises. A mobile communication system transmitting and receiving signals via a wireless network is particularly more susceptible to the distortion and noises than is a wired communication system.

For this reason, various methods have been proposed to reduce the influence of the distortion and noises on the mobile communication system. For example, in order to reduce a bit error rate from $10^{-2}$ to $10^{-3}$ in an Additive White Gaussian Noise ("AWGN") environment using the typical modulation technique and coding technique, a low signal-to-noise ratio ("SNR") of about 1 dB to 2 dB is required. On the other hand, in order to obtain the same results in a multipath fading environment, it is necessary to increase the SNR to about 10 dB. However, a method of increasing transmission power in order to increase the SNR for a reduction in the bit error rate may decrease the entire system performance undesirably. Therefore, a technique for effectively reducing or removing the influence of fading, i.e., the influence of distortion or noises without additional power or a loss of bandwidth in both a User Equipment ("UE") and a Node B is very important to the mobile communication system. One of the effective plans used for this is a channel interleaving technology combined with an error control coding technique.

The interleaving technology interleaves transmission bits before transmission to disperse a portion of data bits, which may be possibly damaged, to several places instead of concentrating the portion on a single place. That is, the interleaving technology prevents a burst error by allowing adjacent bits to be randomly affected by fading.

Meanwhile, codes used for the error control coding technique are divided into a memoryless code and a memory code. The memoryless code includes a linear block code, while the memory code includes a convolutional code and a turbo code. Further, a device for performing coding by the error control coding technique is called a "channel encoder".

A future mobile communication system requires reliable transmission of high-speed multimedia data, and therefore, a more powerful channel coding technique is needed. A channel coding technique using the turbo code shows performance nearest to the Shannon limit in the light of the bit error rate ("BER") even in the low SNR. An output of a channel encoder using the turbo code can be divided into systematic bits and parity bits. Here, the "systematic bits" refer to actual signals to be transmitted, while the "parity bits" refer to signals added to help a receiver correct a possible transmission error. However, even the error control coded signals cannot overcome a possible burst error occurring in the systematic bits or the parity bits. Such a phenomenon often occurs while the data pass through a fading channel. The interleaving is one of the techniques for preventing this phenomenon. This interleaving technique prevents generation of the burst error, contributing to an improvement in the channel coding effect.

The interleaved signals are mapped on a symbol-by-symbol basis in a digital modulator. Here, an increase in the order of the modulator results in an increase in the number of bits included in one symbol. Particularly, in the case of a high-order modulation technique of over 8-ary Phase Shift Keying ("8PSK"), one symbol includes 3 or more information bits, and the bits can be classified according to their reliabilities. Here, as to the reliability, in a process of modulating one symbol by the transmitter, the symbol expressing two bits in a macro region like the left/right quadrants or upper/lower quadrants on the X/Y-axis as shown in FIGS. 1 and 2 is said to have "higher reliability", and the symbol expressing two bits in a micro region is said to have "lower reliability".

FIG. 1 illustrates a signal constellation diagram for 16-ary Quadrature Amplitude Modulation ("16QAM") modulation, and FIG. 2 illustrates a signal constellation diagram for 64-ary Quadrature Amplitude Modulation ("64QAM") modulation.

Referring to FIG. 1, 16QAM-modulated symbols are each comprised of 4 bits, and have a reliability pattern [H,H,L,L], where H represents a bit position having higher reliability and L represents a bit position having lower reliability. That is, the leading two bits have higher reliability and the following two bits have lower reliability.

Referring to FIG. 2, 64QAM-modulated symbols are each comprised of 6 bits, and have a reliability pattern [H,H,M,M,L,L], where H represents a bit position having higher reliability, M represents a bit position having medium reliability and L represents a bit position having lower reliability.

A transmitter for a common High Speed Downlink Packet Access ("HSDPA") mobile communication system is comprised of a channel encoder, an interleaver and a modulator, as illustrated in FIG. 3.

Referring to FIG. 3, N transport blocks are provided to a tail bit generator 310, where tail bits are added to the N transport blocks each. A channel encoder 312 encodes the bits constituting each of the N tail bit-added transport blocks, and outputs coded bits. The channel encoder 312 has at least one coding rate in order to encode the N transport blocks. The coding rate can be 1/2 or 3/4. The channel encoder 312 can obtain a desired coding rate through code symbol puncturing or symbol repetition using an R=1/6 or 1/5 mother code. Further, when supporting a plurality of coding rates, the channel encoder 312 is required to select a coding rate to be used among the supportable coding rates by controlling the code symbol puncturing and the symbol repetition. FIG. 3 illustrates a structure in which the channel encoder 312 selects the coding rate under the control of the controller 320.

The coded bits output from the channel encoder 312 are applied to a rate matcher 314, where they are subject to rate matching. Commonly, the rate matching is performed through repetition and/or puncturing on the coded bits, when a transport channel is subject to multiplexing or the output bits of the channel encoder are not identical in number to the symbols transmitted over the air. The coded bits rate-matched by the rate matcher 314 are applied to an interleaver 316, where the rate matched coded bits are interleaved. The interleaving operation is to minimize a possible data loss during transmission. The interleaved coded bits are applied to an M-ary modulator 318, where they are subject to symbol mapping according to a modulation mode or technique of QPSK, 8PSK, 16QAM or 64QAM. The controller 320 controls a coding operation of the channel encoder 312 and a modulation mode of the modulator 318 according to a state of the current radio channel. The HSDPA mobile communication system uses Adaptive Modulation and Coding Scheme ("AMCS") as the controller 320 in order to selectively use the modulation modes of QPSK, 8PSK, 16QAM and 64QAM according to the radio environment. Though not illustrated in the drawing, the CDMA mobile communication system spreads transmission data with Walsh codes W and orthogonal codes PN, so that a corresponding UE can identify a channel transmitting the data and a Node B transmitting the data.

In the foregoing description of the transmitter, the coded bits are not separately described for the systematic bits and the parity bits. However, the coded bits output from the turbo encoder 312 of the transmitter can be divided into systematic bits and parity bits. Of course, the systematic bits and the parity bits output from the channel encoder 312 have different priorities. In other words, in the case where errors occur in transmission data at a given rate, it is possible to perform better decoding when the errors occur in the parity bits than when the errors occur in the systematic bits. The reason is, as stated above, that the systematic bits are the actual information bits, while the parity bits are the bits added to help the receiver to correct transmission errors during decoding.

Therefore, it is possible to map the interleaved systematic bits and parity bits to the bit positions with higher reliability, the bit positions with medium reliability and the bit positions with lower reliability according to their priorities. Recently, a Symbol Mapping method based on Priority ("SMP") technique has been proposed for increasing system performance by decreasing probability that errors will occur in the systematic bits having higher priority than the parity bits.

For example, in the case of 16QAM, 4 coded bits are mapped to one symbol before transmission in such a manner that the first two bits are mapped to the bit positions with higher reliability and the last two bits are mapped to the bit positions with lower reliability. In the case of retransmission, the retransmission bits are also transmitted with the same reliability at each transmission. That is, the coded bits initially transmitted through the bit positions with higher reliability are transmitted through the bit positions with higher reliability even at retransmission. Similarly, the coded bits initially transmitted through the bit positions with lower reliability are transmitted through the bit positions with lower reliability even at retransmission. Therefore, there is a high probability that errors will occur in specific bits. In this case, the effect of a coding gain may be reduced, because decoding performance of a turbo decoder is improved when its input bits have a homogeneous Log Likelihood Ratio ("LLR").

Therefore, a new retransmission technique (Hybrid Automatic Repeat Request ("H-ARQ")) needs to be introduced to the transmitter and the receiver, considering the fact that decoding performance of the turbo decoder is improved when its input bits have a homogeneous LLR.

SUMMARY OF THE INVENTION

It is, therefore, an object of the present invention to provide a data transmission/reception apparatus and method for improving performance of a mobile communication system.

It is another object of the present invention to provide a data transmission/reception apparatus and method having high reliability in a mobile communication system.

It is further another object of the present invention to provide a data transmission/reception apparatus and method capable of receiving bits at a higher reception probability at a receiver in a mobile communication system.

It is yet another object of the present invention to provide a data transmission/reception apparatus and method having higher efficiency in a retransmission technique (H-ARQ).

It is still another object of the present invention to provide a data transmission/reception apparatus and method capable of obtaining both a coding effect and a diversity gain in a mobile communication system using the H-ARQ technique.

It is still another object of the present invention to provide a data transmission/reception apparatus and method capable of utilizing characteristics of a turbo decoder.

It is still another object of the present invention to provide a data transmission apparatus and method for increasing decoding probability by mapping bits in a transmission frame to bit positions with different reliabilities at initial transmission and every retransmission, thus to average LLR values for input bits of a channel decoder.

It is still another object of the present invention to provide a data reception apparatus and method for increasing decoding probability by rearranging bits in a received frame at initial reception and every re-reception, thus to average LLR values for input bits of a channel decoder.

According to a first aspect of the present invention, there is provided a method for retransmitting k×N coded bits in a CDMA mobile communication system including a modulator and a high-order modulator. The modulator generates a coded bit stream with error correcting bits by receiving a data bit stream. The high-order modulator modulates k×N coded bits in the coded bit stream into N symbols each comprised of k bits, each symbol being comprised of a first bit part with higher reliability and a second bit part with lower reliability. The method comprises cyclic-shifting the k×N coded bits to be retransmitted by a prescribed number of bits, at each retransmission request, sequentially dividing the k×N cyclic-shifted coded bits by k/2 bits, and alternately arranging the divided coded bits in the first bit part and the second bit part.

According to a second aspect of the present invention, there is provided a method for retransmitting a coded bit stream in a transmission apparatus for a CDMA mobile communication system including an encoder and a high-order modulator. The encoder generates a coded bit stream with error correcting bits by receiving a data bit stream. The high-order modulator sequentially maps the coded bit stream to symbols each having a fixed reliability pattern. The method comprises cyclic-shifting the coded bit stream to be retransmitted by a prescribed number of bits, at a retransmission request, and sequentially mapping the cyclic-shifted coded bit stream to the fixed reliability pattern on a bit-by-bit basis.

According to a third aspect of the present invention, there is provided a transmission apparatus for a CDMA mobile communication system that, for example, includes an encoder for generating a coded bit stream with error correcting bits by receiving a data bit stream, an interleaver for interleaving the coded bit- stream and generating an interleaved coded bit stream, and a $2^k$-ary modulator for modulating k×N coded bits in the coded bit stream into N symbols each comprised of k bits. Each symbol comprises a first bit part with higher reliability and a second bit part with lower reliability. The apparatus comprises a shifter intervening between an interleaver and a modulator, for cyclic-shifting first k/2 coded bits among the k×N coded bits to a rear part of the k×N coded bits, at a retransmission request for the k×N coded bits. The apparatus also includes a $2^k$-ary modulator for sequentially dividing the cyclic-shifted k×N coded bits by k/2 bits, and alternately arranging the divided coded bits in a first bit part and a second bit part, each part having N symbols each comprised of k bits.

According to a fourth aspect of the present invention, there is provided a transmission apparatus for a CDMA mobile communication system that includes an encoder for generating a coded bit stream with error correcting bits by receiving a data bit stream, and a high-order modulator for sequentially mapping the coded bit stream to symbols each having a fixed reliability pattern. The apparatus comprises a buffer controller for controlling cyclic shift on the coded bit stream to be retransmitted according to a predetermined cyclic shift pattern to change the coded bit stream based on the number of retransmission requests, at a retransmission request. The apparatus also includes a shifter for storing the coded bit stream to be retransmitted, and cyclic-shifting the coded bit stream to be retransmitted by a prescribed number of bits according to the cyclic shift pattern from the buffer controller. A modulator sequentially maps the cyclic-shifted coded bit stream to be retransmitted to the fixed reliability pattern on a bit-by-bit basis.

According to a fifth aspect of the present invention, there is provided a method for receiving data in which a bit stream comprised of at least 3 bits represents one symbol and includes a first bit part with higher reliability and (a second bit part with lower reliability, in a reception apparatus for a CDMA mobile communication system. The method comprises demodulating coded bits existing in the first bit part and coded bits existing in the second bit part and outputting one coded bit stream, at retransmission. The demodulated coded bit stream is cyclic-shifted by a prescribed number of bits and the demodulated coded bit stream is rearranged. The method also includes combining coded bits constituting the rearranged coded bit stream with coded bits constituting a coded bit stream received at initial transmission and previous retransmission, and transmitting a retransmission request according to whether errors have occurred in information bits decoded from the combined coded bits.

According to a sixth embodiment of the present invention, there is provided a reception apparatus for receiving data in which a bit stream comprised of at least 3 bits represents one symbol and includes a first bit part with higher reliability and a second bit part with lower reliability, in a reception apparatus for a CDMA mobile communication system. The apparatus comprises a demodulator for demodulating received data and outputting one coded bit stream. A buffer controller controls cyclic shift on the demodulated coded bit stream according to a predetermined cyclic shift pattern to change the coded bit stream based on a number of retransmission requests, at retransmission. A rearrangement part for storing the demodulated coded bit stream rearranges the demodulated coded bit stream through cyclic shift on the demodulated coded bit stream by a prescribed number of bits according to the predetermined cyclic shift pattern from the buffer controller.

BRIEF DESCRIPTION OF THE DRAWINGS

The above and other objects, features and advantages of the present invention will become more apparent from the following detailed description when taken in conjunction with the accompanying drawings in which:

Figure 2:
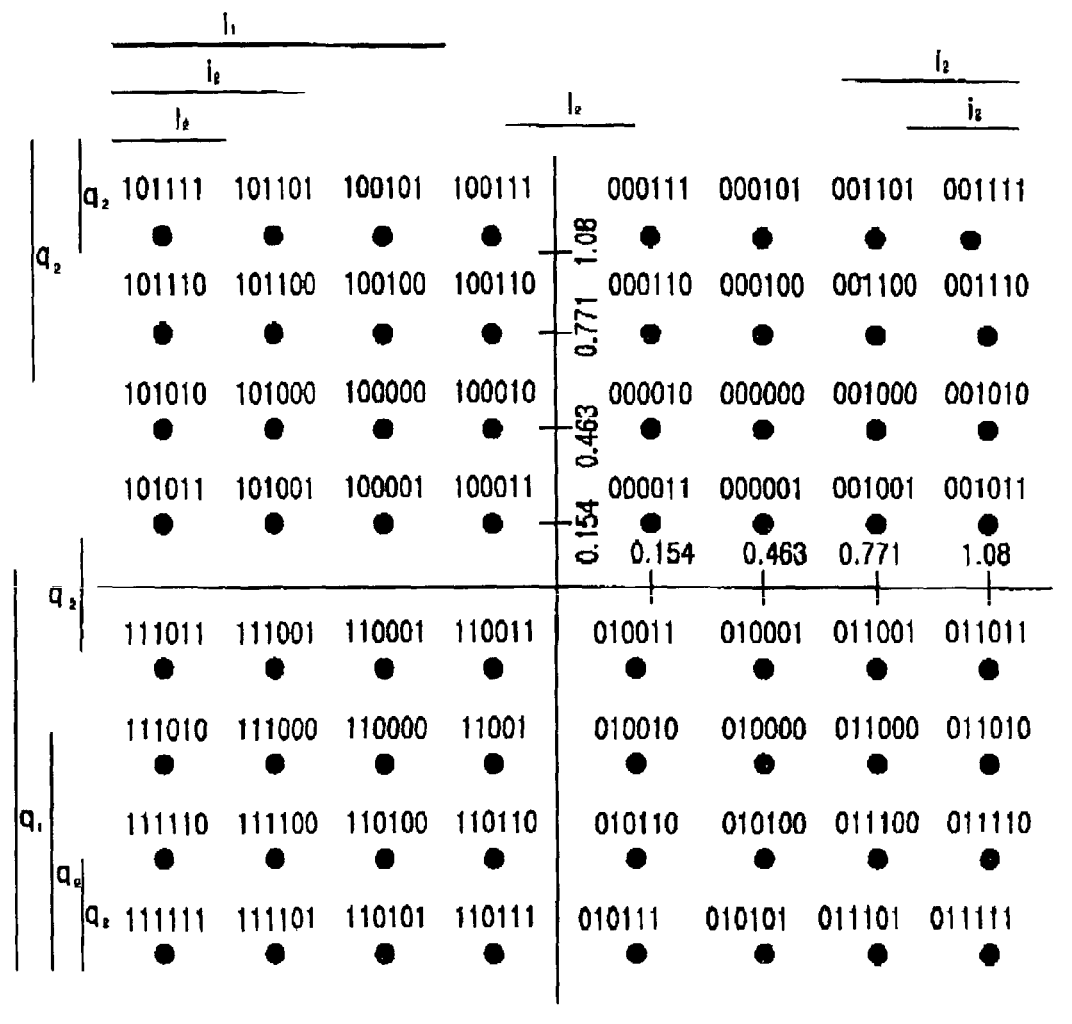

FIG. 2 illustrates a conventional signal constellation diagram for 64-ary Quadrature Amplitude Modulation ("64QAM") modulation;

FIG. 8 illustrates another example of a buffer rearrangement operation in the transmitter according to an embodiment of the present invention;

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In a mobile communication system, a coding rate R of a channel encoder can be represented by R=k/n. Here, k indicates the number of input bits, and n indicates the number of output bits. For example, in the case of the symmetric coding rate 1/2, the channel encoder receives 1 input bit and generates 2 output bits. The output bits are comprised of 1 systematic bit and 1 parity bit. In the case of the asymmetric coding rate 3/4, the channel encoder receives 3 input bit and generates 4 output bits. The output bits are comprised of 3 systematic bits and 1 parity bit.

The Hybrid Automatic Repeat Request ("H-ARQ") to be linked to the SMP technique according to one aspect of the present invention is a link control technique for correcting an error by retransmitting the errored data upon occurrence of a packet error. The H-ARQ is classified into H-ARQ Type II and H-ARQ Type III according to whether to retransmit information bits. Typically, Full Incremental Redundancy ("FIR") represents the H-ARQ Type II. Further, the H-ARQ Type II is divided into Chase Combing ("CC") and Partial Incremental Redundancy ("PIR") according to whether parity bits used for retransmission are identical to each other. Herein, a description of the embodiment of the present invention will be made separately with reference to the H-ARQ Type II and the H-ARQ Type III.

Figure 1:
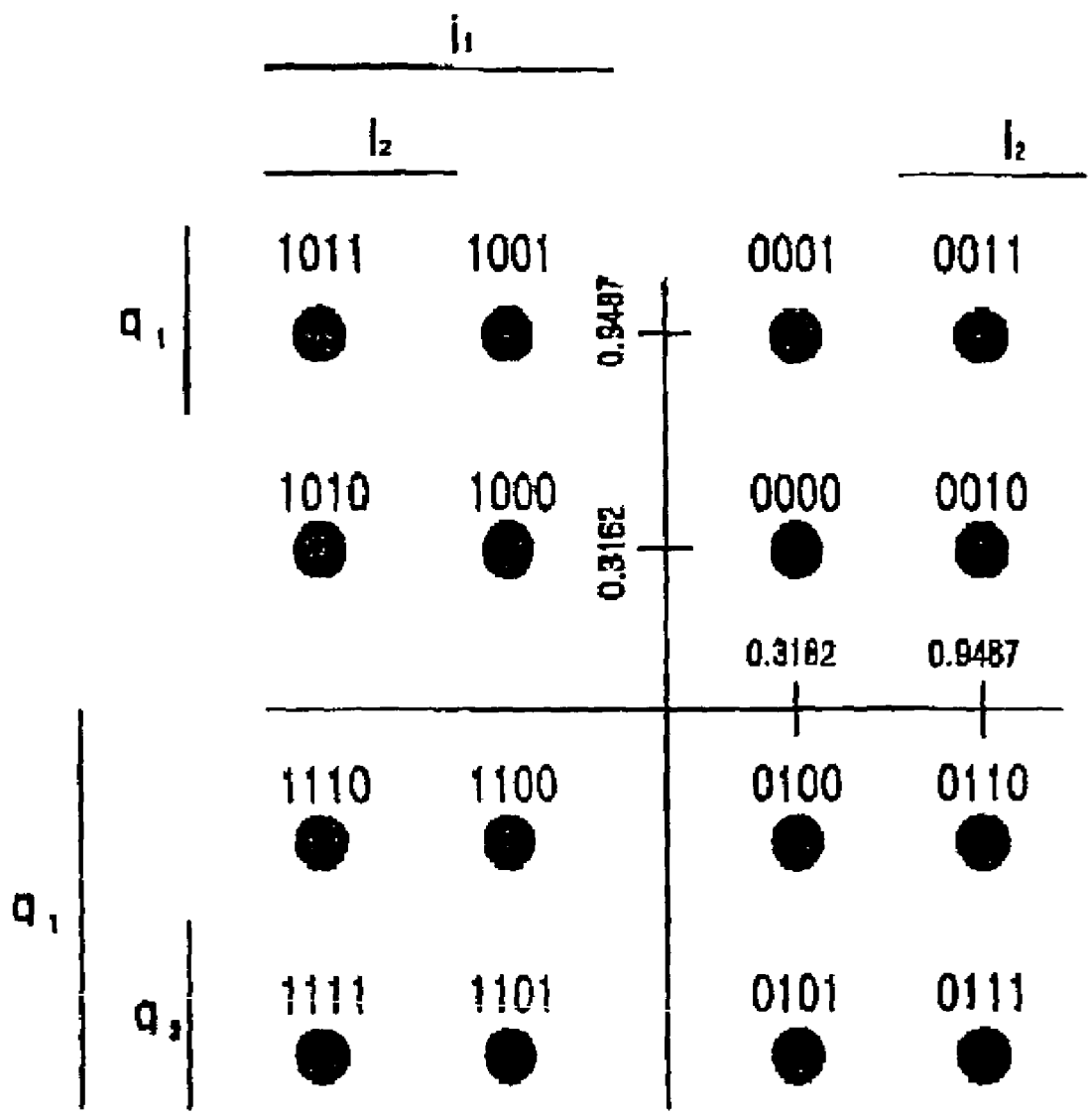
FIG. 1 illustrates a conventional signal constellation diagram for 16-ary Quadrature Amplitude Modulation ("16QAM") modulation.
Figure 3:
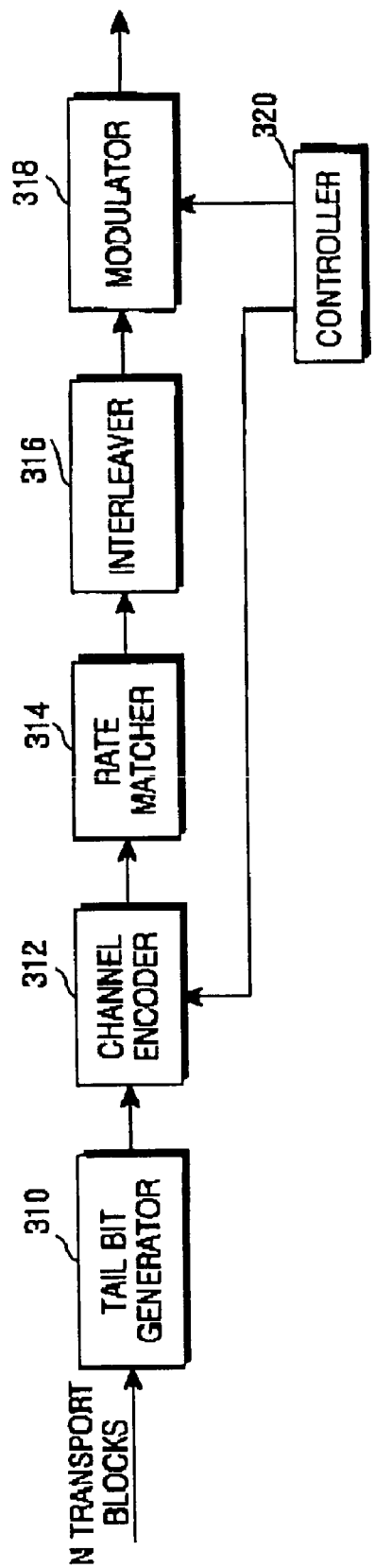
FIG. 3 illustrates a structure of a channel encoder in a conventional CDMA mobile communication system.
Figure 4:
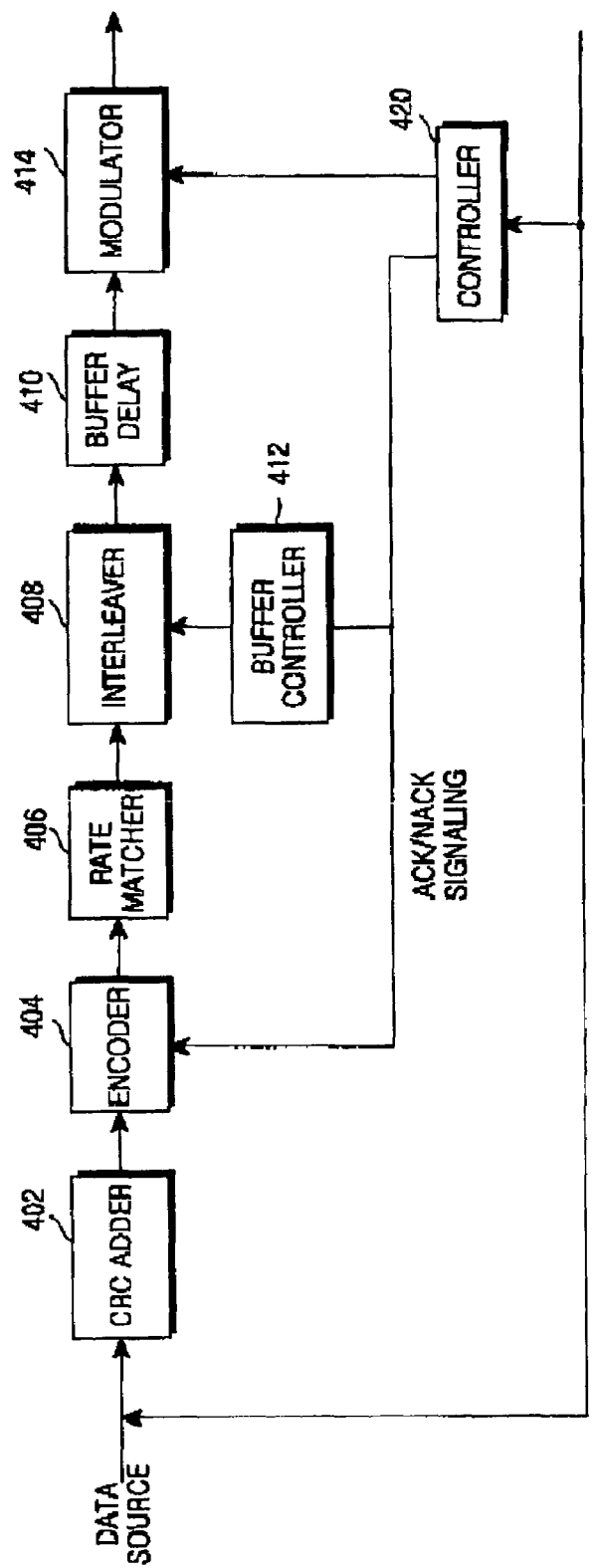
FIG. 4 illustrates a structure of a transmitter in a CDMA mobile communication system according to an embodiment of the present invention.
Figure 5:
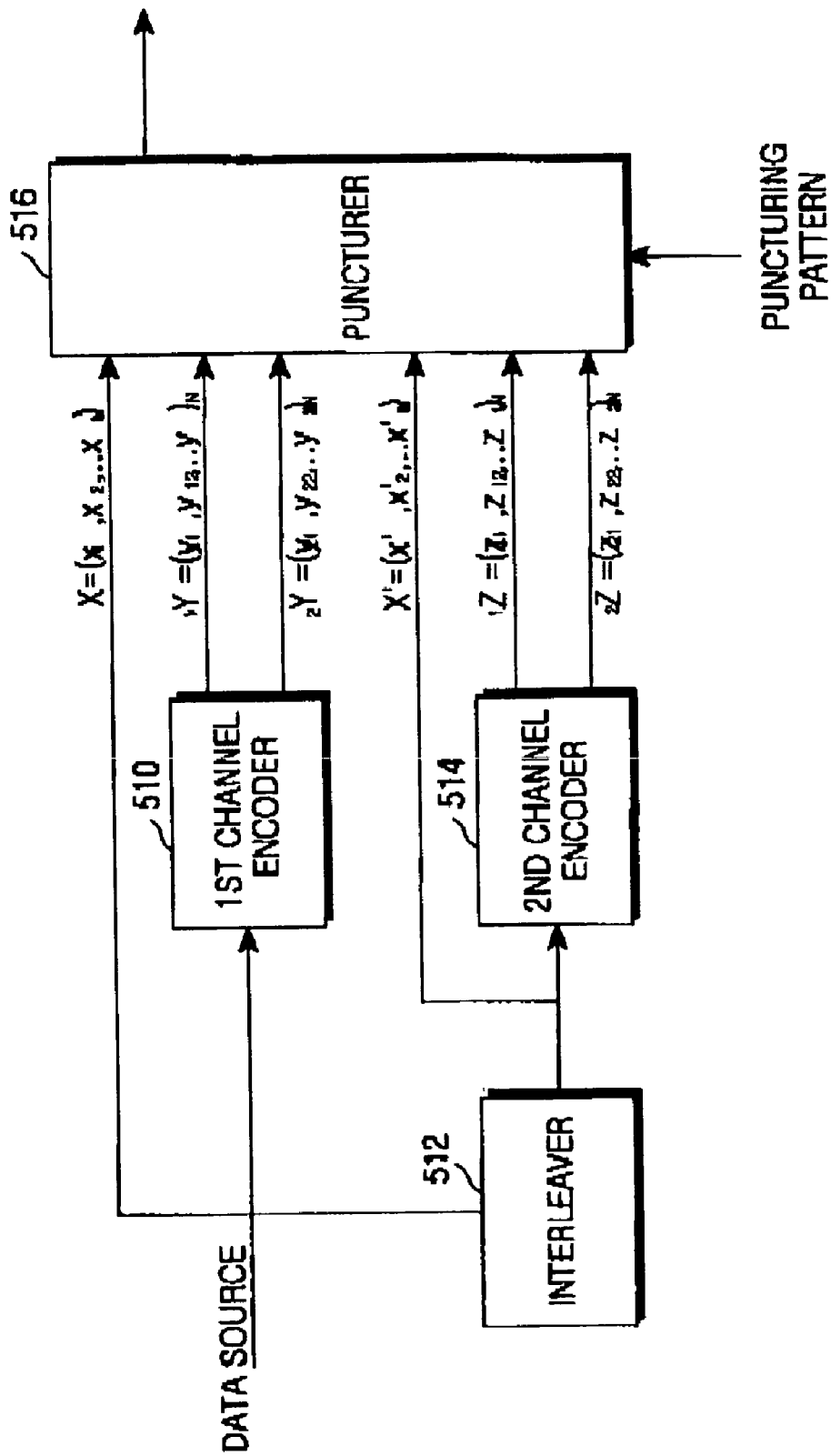
FIG. 5 illustrates a detailed structure of the channel encoder shown in FIG. 4.

FIG. 4 illustrates a structure of a transmitter in a CDMA mobile communication system according to an embodiment of the present invention. Referring to FIG. 4, a Cyclic Redundancy Check ("CRC") addition part 402 receives transmission data source, and adds CRC for error checking on the received data. A channel encoder 404 receives the CRC-added data, and encodes the received data using a prescribed code. The prescribed encoder refers to an encoder for outputting transmission bits and error control bits for the transmission bits by coding the received data. The prescribed coder, as mentioned above, includes a turbo coder and a systematic convolutional coder. Meanwhile, the channel encoder 404 encodes data at a prescribed coding rate. The prescribed coding rate determines a ratio of systematic, bits to parity bits output from the channel encoder 404. For example, if the prescribed coding rate is a symmetrical coding rate of 1/2, the channel encoder 404 receives 1 bit, and outputs 1 systematic bit and 1 parity bit. However, if the prescribed coding rate is an asymmetrical coding rate of 3/4, the channel encoder 404 receives 3 bits, and outputs 3 systematic bits and 1 parity bit. An embodiment of the present invention described below may be equally applied not only to the coding rates 1/2 and 3/4 but also to other coding rates. That is, the embodiment of the present invention delays the coded bits by only the modulation order regardless of the coding rate. A detailed structure of the channel encoder 404 is illustrated in FIG. 5.

A rate matcher 406 performs rate matching through repetition and puncturing on the coded bits from the channel encoder 404. An interleaver 408 receives the coded bits from the rate matcher 406, and interleaves the received coded bits. Therefore, the coded bits output from the interleaver 408 are randomly located in a buffer delay 410. The buffer delay 410 delays the buffered coded bits in a prescribed bit unit, under the control of a buffer controller 412.

The buffer controller 412 determines whether to delay the coded bits buffered or temporarily stored in the buffer delay 410, at a retransmission request from a receiver. Further, the buffer controller 412 controls the buffer delay 410 according to the determination. An operation of the buffer delay 410 is applicable to all the H-ARQ types of CC, PIR and FIR, and a detailed description of this will be made later with reference to an embodiment. Although the retransmission request is represented by an ACK/NACK signal in FIG. 4, a retransmission command is issued by an upper layer that has received a retransmission request from the receiver. Therefore, in this embodiment, a retransmission command may be provided to the buffer controller 412 from the upper layer.

A modulator 414 maps the coded bits from the buffer delay 410 to prescribed symbols, before transmission to the receiver. For example, when using 16QAM modulation, the modulator 414 maps the coded bits to the symbols having the reliability pattern [H,H,L,L]. A controller 420 controls the overall operation of the transmitter. The controller 420 determines the coding rate and the modulation mode to be used in the current radio channel state. The controller 420 controls a coding rate of the channel encoder 404 according to the determined coding rate, and controls the modulator 414 according to the determined modulation mode.

Although the buffer delay 410 is controlled by the retransmission request from the buffer controller 412 in FIG. 4, the function of the buffer controller 412 may be replaced with the same function of an undepicted upper layer.

FIG. 5 illustrates a detailed structure of the channel encoder 404 shown in FIG. 4. The channel encoder of FIG. 5 uses an R=1/6 code adopted in $3^{rd}$ Generation Partnership Project ("3GPP").

Referring to FIG. 5, upon receiving one transmission frame, the channel encoder outputs the intact transmission frame as a systematic bit frame X. The transmission frame is also provided to a first channel encoder 510, and the first channel encoder 510 performs coding on the transmission frame and outputs two different parity bit frames $Y_1$ and $Y_2$.

In addition, the transmission frame is also provided to an interleaver 512, and the interleaver 512 interleaves the transmission frame. The intact interleaved transmission frame is transmitted as an interleaved systematic bit frame X'. The interleaved transmission frame is provided to a second channel encoder 514, and the second channel encoder 514 performs coding on the interleaved transmission frame and outputs two different parity frames $Z_1$ and $Z_2$.

The systematic bit frame X is comprised of a transmission unit of $x_1,x_2,\ldots,x_N$, and the interleaved systematic bit frame X' is comprised of a transmission unit of $x'_1,x'_2,\ldots,x'_N$. The parity bit frame $y_1$ is comprised of a transmission unit of $y_{11},y_{12},\ldots,y_{1N}$, and the party bit frame $Y_2$ is comprised of a transmission unit of $y_{21},y_{22},\ldots,y_{2N}$. Finally, the party bit frame $Z_1$ is comprised of a transmission unit of $z_{11},z_{12},\ldots,z_{1N}$, and the party bit frame $Z_2$ is comprised of a transmission unit of $z_{21},z_{22},\ldots,z_{2N}$.

The systematic bit frame X, the interleaved systematic bit frame X', and the four different parity bit frames $Y_1$, $Y_2$, $Z_1$, and $Z_2$ are provided to a puncture 516. The puncture 516 punctures the systematic bit frame X, the interleaved systematic bit frame X', and the four different parity bit frames $Y_1$, $Y_2$, $Z_1$, and $Z_2$ according to a puncturing pattern provided from the controller (AMCS) 420, and exclusively outputs desired systematic bits S and parity bits P. Here, the puncturing pattern is determined according to a coding rate of the channel encoder 404 and the H-ARQ type in use. The typical puncturing patterns are defined as $$P_1 = \begin{bmatrix} 1 & 1 \\ 1 & 0 \\ 0 & 0 \\ 0 & 0 \\ 0 & 0 \\ 0 & 1 \end{bmatrix} \quad \text{Equation (1)}$$

$$P_2 = \begin{bmatrix} 1 & 1 \\ 1 & 0 \\ 0 & 0 \\ 0 & 0 \\ 0 & 1 \\ 0 & 0 \end{bmatrix} \quad \text{Equation (2)}$$

The puncturing patterns of Equations (1) and (2) are used when the H-ARQ Type III (CC and PIR) is used and the channel encoder 404 has a coding rate 1/2. In the case of the CC, the puncture 516 repeatedly uses the puncturing pattern of Equation (1) or (2) at initial transmission and retransmission. In the case of the PIR, the puncture 516 repeatedly uses the two puncturing patterns at each transmission. If the H-ARQ Type II (FIR) is used, the puncture 516 uses a puncturing pattern for puncturing the systematic bits at retransmission. For example, a puncturing pattern for the H-ARQ Type II becomes "010010".

In the case of the CC, if it is assumed that the puncture 516 uses the puncturing pattern of Equation (1), the puncture 516 outputs X and $Y_1$ according to the puncturing pattern "110000", and further, outputs X and $Z_2$ according to the puncturing pattern "100001" and punctures the other bits, at each transmission. As another example, if it is assumed that the puncture 516 uses the puncturing pattern of Equation (2), the puncture 516 outputs X and $Y_1$ according to the puncturing pattern "110000", and further, outputs X and $Z_1$ according to the puncturing pattern "100010" and punctures the other bits, at each transmission. In the case of the PIR, if the X, $Y_1$, X and $X_2$ are transmitted at initial transmission, the X, $Y_1$, X and $Z_1$ are transmitted at retransmission.

When using an R=1/3 code adopted in 3GPP, the channel encoder may be implemented with the first channel encoder 510 and the puncture 516 shown in FIG. 5.

Figure 6:
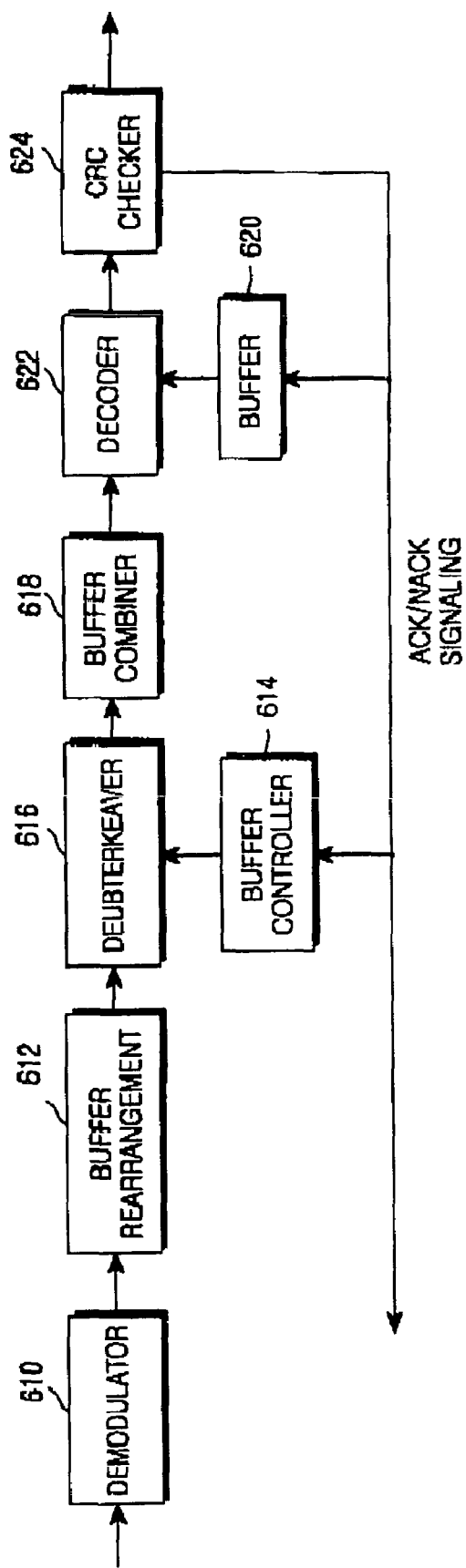
FIG. 6 illustrates a structure of a receiver corresponding to the transmitter of FIG. 4, in the CDMA mobile communication system according to an embodiment of the present invention.

FIG. 6 illustrates a structure of a receiver corresponding to the transmitter of FIG. 4, according to an embodiment of the present invention. Referring to FIG. 6, a demodulator 610 receives modulated data transmitted from the transmitter, and demodulates the received data according to a demodulation mode corresponding to the modulation mode used in the modulator 414 of the transmitter. A buffer rearrangement part 612 receives the demodulated data from the demodulator 610, and rearranges the demodulated data to combine it under the control of a buffer controller 614. The buffer rearrangement part 612 provides the rearranged data to a deinterleaver 616. An operation of the buffer controller 614 will be described in detail later. A deinterleaving operation of the deinterleaver 616 corresponds to the interleaving operation performed by the interleaver of the transmitter.

A combiner 618 combines the same coded bits buffering. That is, the combiner 618 is inactivated when normally receiving the coded bits from the transmitter. However, the combiner 618 performs the combining when the transmitter retransmits the same coded bits as the previously transmitted coded bits at a retransmission request. A channel decoder 622 receives the combined coded bits output from the combiner 618, decodes the received coded bits according to a prescribed decoding technique, and outputs desired received bits. Here, the prescribed decoding technique receives systematic bits and parity bits, and decodes the systematic bits. The prescribed decoding technique is determined by the coding technique of the transmitter.

A CRC checker 624 receives the decoded bits output from the channel decoder 622, and checks CRC added to the received bits to determine whether errors have occurred in the received bits. If it is determined that no error has occurred in the received bits, the CRC checker 624 outputs the received bits, and transmits ACK to the transmitter in acknowledgement of the received bits. However, if it is determined that errors have occurred in the received bits, the CRC checker 624 transmits NACK, that is, Negative ACK, to the transmitter to request retransmission of the errored bits.

A buffer 620 is initialized to discard the corresponding coded bits buffered therein upon receiving ACK from the CRC checker 624. However, upon receipt of NACK, the buffer 620 buffers or temporarily stores the corresponding coded bits to combine them with the coded bits to be retransmitted. In addition, the CRC checker 624 provides the ACK/NACK to the buffer controller 614 so that the buffer controller 614 may control the buffer rearrangement part 612.

The present invention proposes a transmitter and a receiver supporting the H-ARQ technique in a CDMA mobile communication system using the 16QAM modulation as the modulation order. The invention expands the modulation to an M-ary modulation order through normalization. The invention separates the H-ARQ type, and proposes several embodiments corresponding to the separated H-ARQ types.

The embodiments of the present invention will further be described in detail herein below with reference to the accompanying drawings. In the following description, it will be assumed that the embodiments of the present invention use 16QAM as the modulation order, use the coding rate 1/2, use CC and PIR as the H-ARQ type, and uses the puncturing pattern of Equation (1). In addition, the detailed description of the embodiments will be separately made for the different H-ARQ types, including CC, PIR and FIR. Further, the S bits and the P bits are commonly known as the coded bits. Therefore, in the following description, the term "coded bits" will be construed as the S bits and the P bits.

1. Chase Combining ("CC") Used as H-ARQ Type

First, an operation of transmitting data will be described with reference to the structure of the HSDPA transmitter shown in FIG. 4.

The CRC addition part 402 adds CRC to transmission data, and the CRC-added data is coded with a prescribed code by the channel encoder 404. That is, the channel encoder 404 outputs coded bits. An operation of the channel encoder 404 will be described in more detail with reference to FIG. 5. The CRC-added data source is output as the S bits X, and at the same time, provided to the first channel encoder 510. The data source provided to the first channel encoder 510 is coded into different P bits $Y_1$ and $Y_2$ at a prescribed coding rate. Further, the data source is interleaved by the interleaver 512 and then provided to the second channel encoder 514. The interleaved data provided to the second channel encoder 514 is output as other S bits X'. Further, the interleaved data provided to the second channel encoder 514 is coded into different P bits $Z_1$ and $Z_2$ at a prescribed coding rate. The puncture 516 performs puncturing on the S bits X and X', and the P bits $Y_1$, $Y_2$, $Z_1$ and $Z_2$ according to a prescribed puncturing pattern, and outputs final S bits and P bits at a desired coding rate. As stated before, if the H-ARQ type is the CC, the puncturing pattern at initial transmission is identical to the puncturing pattern at retransmission. That is, when the CC is used as the H-ARQ type, the bits transmitted at initial transmission are identical to those transmitted at retransmission. The puncturing pattern is either previously recognized by the puncture 516, or provided from the outside. In FIG. 5, the channel encoder is provided with the puncturing-pattern from the outside.

Figure 7:
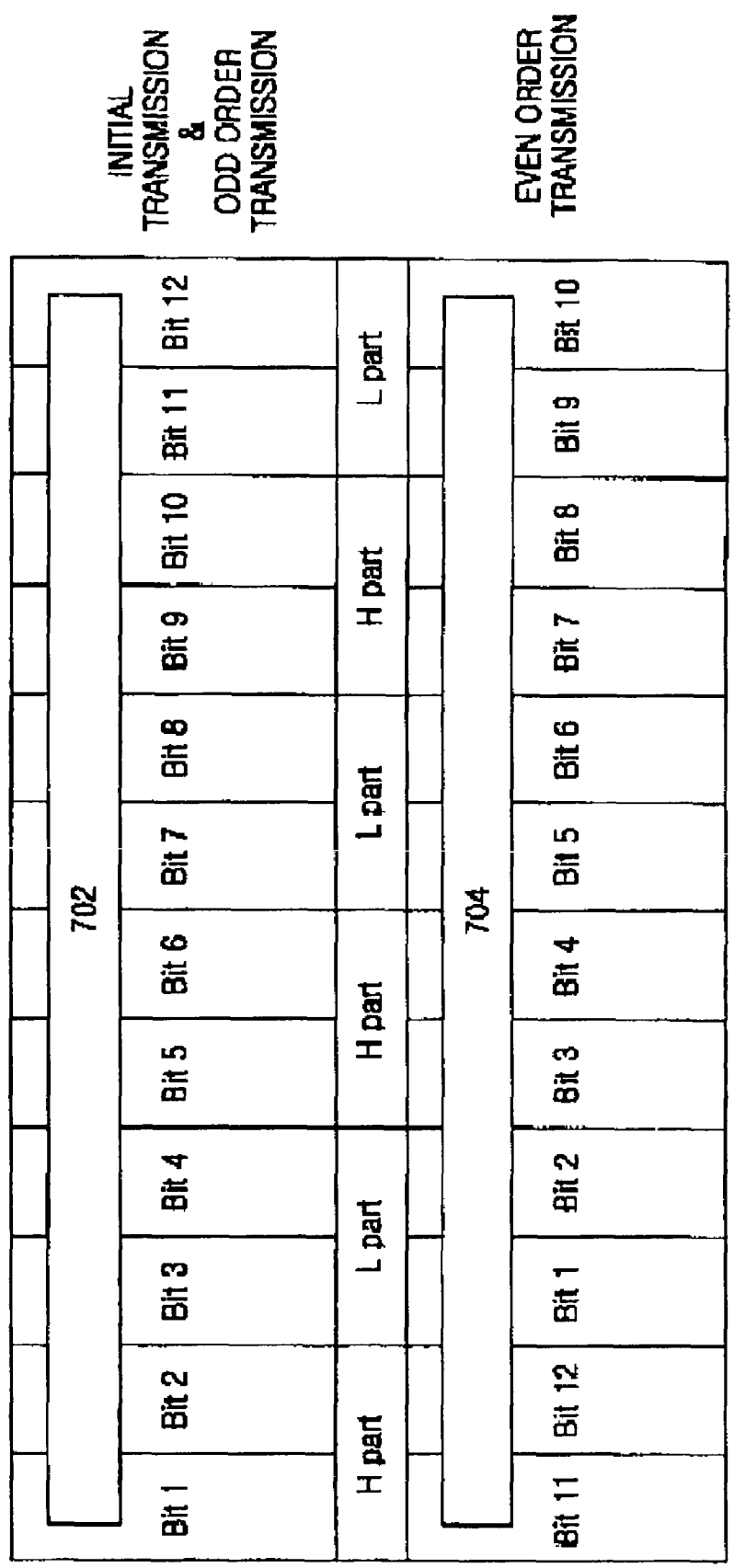
FIG. 7 illustrates an example of a buffer rearrangement operation in the transmitter according to an embodiment of the present invention.

Referring back to FIG. 4, the coded bits from the channel encoder 404 are provided to the rate matcher 406, where they are subject to rate matching. Commonly, the rate matching is performed by repetition and puncturing operations on the coded bits, when a transport channel is subject to multiplexing or the output bits of the channel encoder are not identical in number to the symbols transmitted over the air. The coded bits rate-matched by the rate matcher 406 are interleaved by the interleaver 408 according to a predetermined interleaving pattern. The interleaving pattern is recognized by the receiver. The interleaved coded bits from the interleaver 408 are delayed as shown in FIG. 7 by the buffer delay 410 under the control of the buffer controller 412. The delayed coded bits are provided to the modulator 414, where they are mapped to prescribed symbols. An operation of the buffer delay 410 is illustrated in FIG. 7, by way of example.

It is assumed in FIG. 7 that the modulation is 16 and one frame has 12 bits for the convenience of explanation. In this case, one symbol is comprised of 4 bits, and has a reliability pattern [H,H,L,L]. Therefore, as illustrated in FIG. 7, at initial transmission 702, the $1^{st}$, $2^{nd}$, $5^{th}$, $6^{th}$, $9^{th}$ and $10^{th}$ bit positions are mapped to the bits with higher reliability, and the $3^{rd}$, $4^{th}$, $7^{th}$, $8^{th}$, $11^{th}$ and $12^{th}$ bit positions are mapped to the bits with lower reliability.

However, at retransmission 704 caused by the NACK received from the receiver, the $1^{st}$, $2^{nd}$, $5^{th}$, $6^{th}$, $9^{th}$ and $10^{th}$ bit positions are mapped to the bits with lower reliability, and the $3^{rd}$, $4^{th}$, $7^{th}$, $8^{th}$, $11^{th}$ and $12^{th}$ bit positions are mapped to the bits with higher reliability. That is, a twice-retransmitted bit is mapped to the bit position with higher reliability at initial transmission and the bit position with lower reliability at second transmission. This method is repeated from third transmission.

As an application of the first method, a second method will be introduced in FIG. 8. As in the first method of FIG. 7, it is also assumed in the second method of FIG. 8 that the modulation order is 16 QAM and one frame has 12 bits for the convenience of explanation. In this case, one symbol is comprised of 4bits, and has a reliability pattern [H,H,L,L]. Therefore, at initial transmission, the coded bits are transmitted without delay. However, from first retransmission, the coded bits are delayed bit by bit at each retransmission. Therefore, from initial transmission to third retransmission, a certain bit is transmitted through the bit position with higher reliability twice and through the bit position with lower reliability twice.

Operations of the first method and the second method, normalized with an M-ary modulated signal, will be described herein below.

1) First Method 1.1) At initial transmission, the intact interleaved bits are transmitted to the modulator 414.

1.2) Upon receipt of ACK, the buffer controller 412 transmits the intact interleaved bits to the modulator 414.

1.3) Upon receipt of NACK, the buffer controller 412 delays the coded bits to be retransmitted by $(\log_2 M)/2$ before transmission to the modulator 414.

1.4) Upon receipt of the NACK again, the buffer controller 412 transmits the intact coded bits to be retransmitted to the modulator 414.

1.5) Upon receipt of the NACK once again, the buffer controller 412 delays the coded bits to be retransmitted by $(\log_2 M)/2$ before transmission to the modulator 414.

1.6) Upon receipt of ACK, the buffer controller 412 repeatedly performs the operations of 1.4) and 1.5).

2) Second Method 2.1) At initial transmission, the intact interleaved bits are transmitted to the modulator 414.

2.2) Upon receipt of ACK, the buffer controller 412 transmits the intact interleaved bits to the modulator 414.

2.3) Upon every receipt of NACK, the buffer controller 412 delays the coded bits to be retransmitted by 1 bit, performs this operation on the $1^{st}$ bit to the $(\log_2 M-1)^{th}$ bit, and then delays again the coded bits in the order of $1^{st}$ bit, $2^{nd}$ bit, ..., $(\log_2 M-1)^{th}$ bit.

2.4) The buffer controller 412 continues the operation of 2.3) until the ACK is received.

When the second method is employed, the receiver rearranges received bits by reversely performing the delay operation, and then, combines the rearranged bits. The second method has been introduced as an application of the first method. In the following description, the invention will be described with reference to the first method.

Next, an operation of receiving data will be describe with reference to the structure of the HSDPA receiver, shown in FIG. 6, corresponding to the transmitter.

The demodulator 610 receives data transmitted from the transmitter, and demodulates the received data into coded bits according to a demodulation mode corresponding to the modulation mode used in the modulator 414 of the transmitter. The demodulated coded bits from the demodulator 610 are rearranged by the buffer rearrangement part 612 under the control of the buffer controller 614. The rearranged coded bits are applied to the deinterleaver 616, where they are deinterleaved. An operation of the buffer rearrangement part 612 will be described herein below with reference to FIG. 9.

Figure 9:
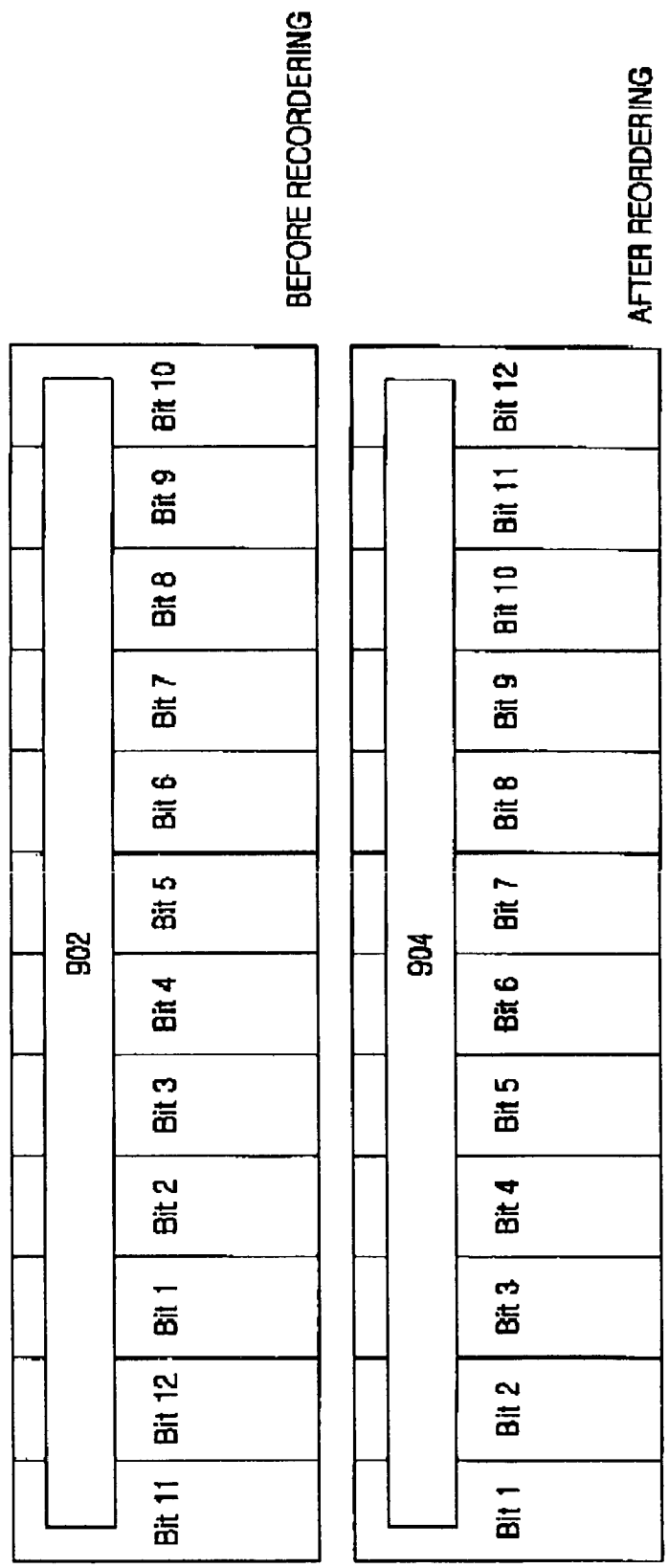
FIG. 9 illustrates an example of a buffer rearrangement operation in a receiver according to an embodiment of the present invention.

After first transmission of NACK, the buffer rearrangement part 612 receives a retransmitted frame as represented by reference numeral 902 of FIG. 9. For combining, the coded bits exist in the same potions at each transmission. Therefore, as represented by reference numeral 904 of FIG. 9, the buffer rearrangement part 612 rearranges the coded bits by delaying (shifting left) the respective bits by 2 bits, and provides the rearranged coded bits to the deinterleaver 616. That is, the operation of the buffer rearrangement part 612 corresponds to the operation of the buffer delay 410 in the transmitter.

The deinterleaver 616 performs deinterleaving according to the interleaving pattern used by the interleaver 408 of the transmitter. The deinterleaved coded bits from the deinterleaver 616 are provided to the combiner 618, where they are subject to combining. That is, the combiner 618 combines the coded bits received at initial transmission with the same coded bits received at retransmission. If there were several retransmissions, the combiner 618 buffered-combines the coded bits received at each retransmission with the coded bits received at initial transmission and previous retransmission. The combining, as stated above, is performed on the same coded bits.

In order to perform combining on the retransmitted coded bits, the combiner 618 recognizes the previously received coded bits. For example, the combiner 618 is provided with the previously received coded bits from the buffer 620, and the buffer 620 determines whether to buffer the previously received coded bits, based on the CRC check results from the CRC checker 624. The combiner 618 provides the combined coded bits to the channel decoder 622. However, at initial transmission, the combiner 618 may not perform combining on the coded bits provided from the deinterleaver 616. Therefore, at initial transmission, the combiner 618 provides the intact coded bits from the deinterleaver 616 to the channel decoder 622.

The channel decoder 622 decodes the coded bits provided from the combiner 618 into information bits transmitted by the transmitter according to a prescribed decoding technique. Here, the prescribed decoding technique is to receive S bits and P bit, and decode the S bits, and the prescribed decoding technique is determined by the coding technique of the transmitter.

The CRC checker 624 receives the information bits decoded by the channel decoder 622, and determines whether errors have occurred in the received information bits, by checking CRC included in the information bits. If it is determined that errors have occurred in the information bits, the CRC checker 624 reports it to the upper layer, and transmits a retransmission request for the corresponding information bits. However, if it is determined that no error has occurred in the information bits, the CRC checker 624 outputs the information bits, and then performs error check on the next information bits provided from the channel decoder 622.

Although not illustrated in FIG. 6, when the CRC checker 624 detects an error, the upper layer transmits NACK to the transmitter for retransmission request. However, if the CRC checker 614 detects no error, the upper layer transmits ACK to the transmitter in acknowledgement of the information bits. As mentioned above, when NACK is transmitted, the errored coded bits are stored in the buffer 620. However, when ACK is transmitted, the buffer 620 is initialized.

Figure 10:
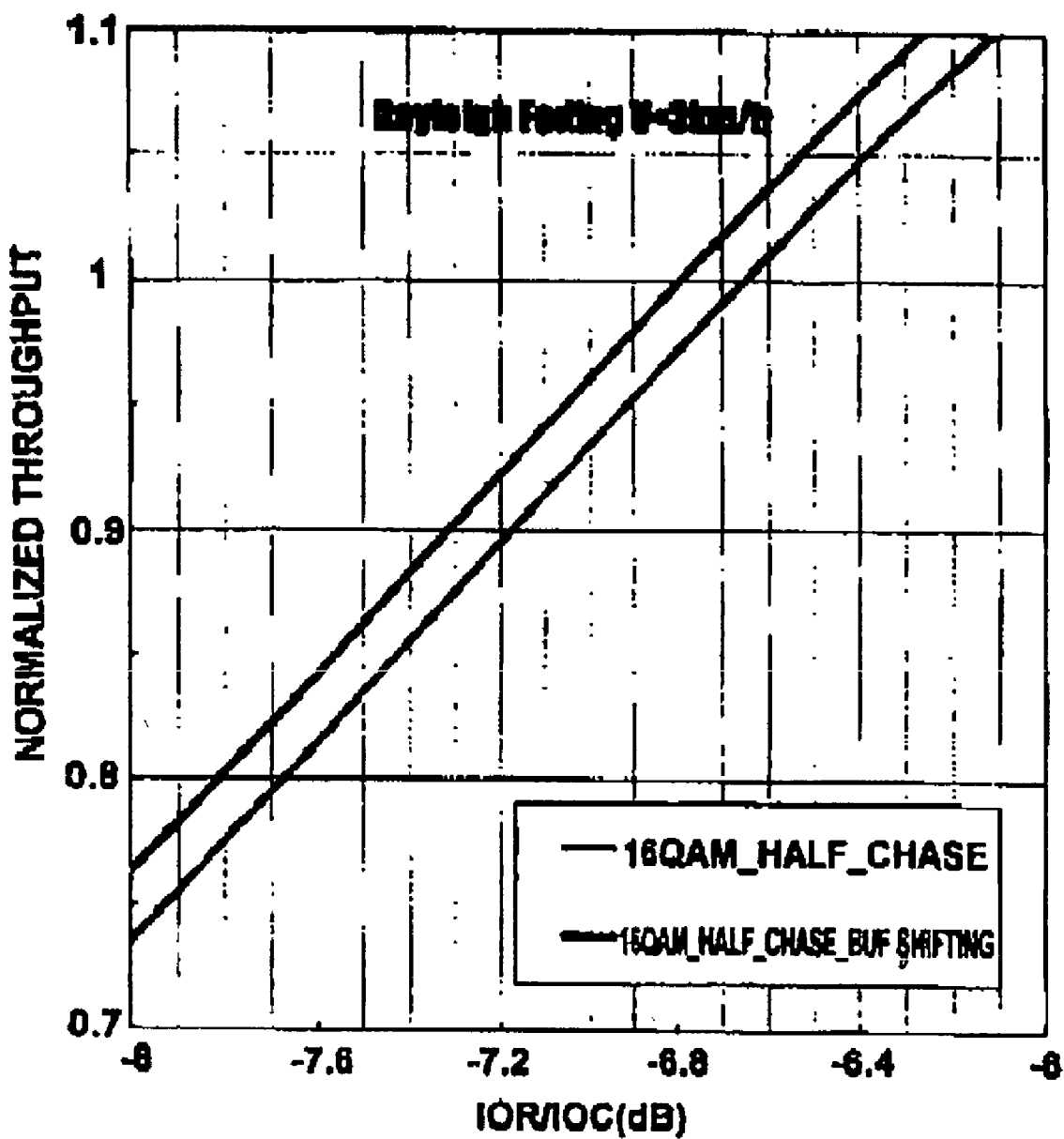
FIG. 10 illustrates a performance comparison between the conventional method and the proposed method in fading environments.
Figure 11:
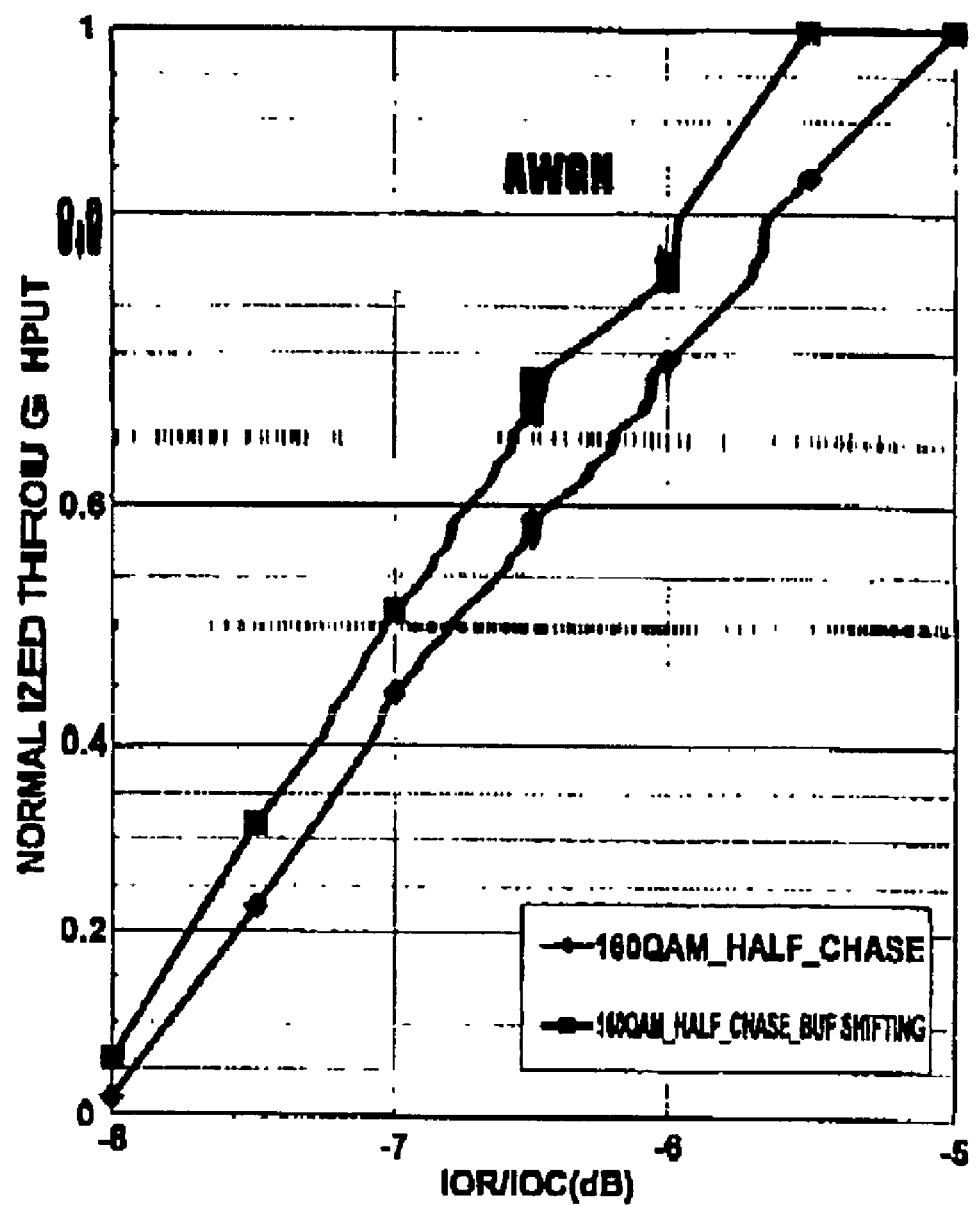
FIG. 11 illustrates a performance comparison between the conventional method and the proposed method in Additive White Gaussian Noise ("AWGN") environments.

FIGS. 10 and 11 illustrate a throughput comparison between the conventional method and the proposed method in fading environment and Additive White Gaussian Noise ("AWGN") environment, respectively. It is noted that the method according to the present invention can obtain a remarkable performance gain in both the fading environment and the AWGN environment.

2. Partial Incremental Request ("PIR") Used as H-ARC Type

First, an operation of transmitting data will be described with reference to the structure of the HSDPA transmitter shown in FIG. 4.

The CRC addition part 402 adds CRC to transmission data, and the CRC-added data is coded with a prescribed code by the channel encoder 404. That is, the channel encoder 404 outputs systematic bits (S bits) which are actual transmission data, and parity bits (P bits) for error controlling the transmission data, through coding. An operation of the channel encoder 404 is performed in the same manner as performed when CC is used as the H-ARQ type. However, the puncturing pattern for the puncture 516 of the channel encoder 404 is newly defined. The puncturing pattern for the PIR is defined such that the same bits are transmitted for the S bits both at initial transmission and retransmission and the different bits from the previously transmitted bits are transmitted for the P bits at initial transmission and retransmission. When the PIR is used, the puncture 516 may alternately use the puncturing patterns of Equations (1) and (2).

The S bits and the P bits output from the channel encoder 404 undergo modulation after passing through the rate matcher 406 and the interleaver 408, as done when the CC is used. That is, when the PIR is used as the H-ARQ type, the transmitter transmits data in the same way as performed when the CC is used as the H-ARQ type, except that the channel encoder 404 has a different puncturing pattern. Here, the buffer controller 412 delays the coded bits by controlling the buffer delay 410 only when the packet is retransmitted. Whether to transmit the packet may be previously recognized by the puncturing pattern.

Next, an operation of receiving data will be described with reference to the structure of the HSDPA receiver, shown in FIG. 6, corresponding to the transmitter.

An operation of processing the data received through the demodulator 610, the buffer rearrangement part 612 and the deinterleaver 616 is performed in the same method as when the CC is used as the H-ARQ type. However, when the PIR is used as the H-ARQ type, the combiner 618 performs combining considering whether the deinterleaved coded bits provided from the deinterleaver 616 are identical to the previously deinterleaved coded bits, at retransmission. This is because the puncturing pattern used for the CC is different from the puncturing pattern used for the PIR. That is, when the PIR is used as the H-ARQ type, the same S bits are transmitted at both initial transmission and retransmission, whereas the same P bits are not transmitted at the initial transmission and retransmission. Therefore, the combining is performed only when the same frame is transmitted. For example, assume that the same P bits as the P bits transmitted at first transmission or initial transmission are transmitted at third transmission or second retransmission, and the same P bits as the P bits transmitted at second transmission or first retransmission are transmitted at fourth transmission or third retransmission. In this case, the coded bits are not delayed at initial transmission and first retransmission, and the coded bits are delayed at second retransmission and third retransmission. Whether the transmitted coded bits are identical may be determined based on the puncturing pattern. A structure for decoding the output of the combiner 618 is also identical to the structure for the case where the CC is used, so the detailed description thereof will not be provided.

3. Full Incremental Request ("FIR") Used as H-ARQ Type

The CRC addition part 402 adds CRC to transmission data, and the CRC-added data is coded with a prescribed code by the channel encoder 404. The channel encoder 404 outputs the S bits and the P bits at the same rate according to the puncturing patterns of Equations (1) and (2) at initial transmission, and outputs only the P bits at retransmission. This may be achieved by adjusting the puncturing pattern of the puncture 516 in the channel encoder 404, and the puncturing pattern is recognizable by both the transmitter and the receiver. When the FIR is used as the H-ARQ type, puncturing patterns $P_3$ and $P_4$ used for retransmission are defined as $$P_3 = \begin{bmatrix} 0 & 0 \\ 1 & 0 \\ 1 & 0 \\ 0 & 0 \\ 0 & 1 \\ 0 & 1 \end{bmatrix} \qquad \text{Equation (3)}$$

$$P_4 = \begin{bmatrix} 0 & 0 \\ 0 & 1 \\ 0 & 1 \\ 0 & 0 \\ 1 & 0 \\ 1 & 0 \end{bmatrix} \qquad \text{Equation (4)}$$

As shown in Equations (3) and (4), when the FIR is used as the H-ARQ type, the channel encoder 404 has the puncturing patterns for puncturing the S bits and outputting only the P bits. For example, when the puncturing pattern of Equation (3) is applied to the channel encoder 404 of FIG. 5, the channel encoder 404 outputs the coded bits $Y_1, Y_2, Z_1$ and $Z_2$.

Therefore, the channel encoder 404 provides the coded bits comprised of the S bits and the P bits to the rate matcher 406 at initial transmission, but provides only the P bits to the rate matcher 406 at retransmission. The coded bits provided to the rate matcher 406 are provided to the interleaver 408 after being rate-matched.

When the FIR is used as the H-ARQ type, the S bits are transmitted only at initial transmission and not transmitted at retransmissions. Since only the P bits are transmitted at retransmissions, a delay in transmitting the coded bits is not considered at initial transmission, but considered from first retransmission. That is, after retransmission, only the same coded bits are delayed. This is because it is preferable to transmit all the P bits with higher reliability instead of transmitting a specific P bit with higher reliability. Therefore, the transmitter decides lower reliability for the two coded bits previously decided to have higher reliability, and higher reliability for the two coded bits previously decided to have lower reliability, through a delay in transmitting the coded bits. The point where the coded bits are delayed may be recognized based on the puncturing pattern, as when the CC or the PIR is used. The delay is performed only when the packet to be transmitted is identical to the previously transmitted packet.

For example, if the puncturing pattern of Equation (3) is used at retransmission, the transmitter decides higher reliability for the coded bits $Y_1$ and $Y_2$ and lower reliability for the coded bits $Z_1$ and $Z_2$ at first retransmission, and decides lower reliability for the coded bits $Y_1$ and $Y_2$ and higher reliability for the coded bits $Z_1$ and $Z_2$ at second retransmission. The decision on the reliability can be made depending on the delay by the buffer delay 410.

The interleaved coded bits are provided to the modulator 414, where they are mapped to the bit positions corresponding to the decided reliabilities before being transmitted to the receiver.

Next, an operation of receiving data will be described with reference to the structure of the HSDPA receiver, shown in FIG. 6, corresponding to the transmitter.

An operation of processing the data received through the demodulator 610, the buffer rearrangement part 612 and the deinterleaver 616 is performed in the same method as done when the CC or the PIR is used as the H-ARQ type. However, when the FIR is used as the H-ARQ type, the same P bits are received with different reliabilities at every other retransmission. Therefore, the combiner 618 combines the same P bits received at each retransmission. The combiner 618 performs combining in the same method as used when the CC or the PIR is used as the H-ARQ type. Meanwhile, a process for decoding the information bits output from the combiner 618 is also identical to the process for the case where the CC or the PIR is used, so the detailed description thereof will not be provided.

As described above, the present invention may remarkably increase transmission efficiency by rearranging the bits stored in the buffer and mapping the rearranged bits to the bit positions with different reliabilities at each retransmission, thus to average LLR values for input bits of the channel decoder. In addition, the present invention may remarkably increase the overall system performance without an increase in system complexity, when utilized for the HSDPA, which may be applied to the wired/wireless transmitter and receiver and may also be standardized in the future. That is, compared with the existing system, the system according to the present invention may increase the throughput by reducing the bit error rate.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for retransmitting k×N coded bits in a Code Division Multiple Access ("CDMA") mobile communication system having a modulator for generating a coded bit stream with error correcting bits by receiving a data bit stream, and a high-order modulator for modulating k×N coded bits in the coded bit stream into N symbols each comprised of k bits, each symbol being comprised of a first bit part with higher reliability and a second bit part with lower reliability, the method comprising:

cyclic-shifting k×N coded bits to be retransmitted by a prescribed number of bits, at each retransmission request;

sequentially dividing the k×N cyclic-shifted coded bits by k/2 bits;

alternately arranging the divided coded bits in the first bit part and the second bit part; and transmitting the arranged divided coded bits.

2. The method as claimed in claim 1, wherein if the retransmission request is an even order transmission request, the prescribed number of bits for cyclic-shifting is 0.

3. The method as claimed in claim 1, wherein if the retransmission request is an odd order retransmission request, the prescribed number of bits for cyclic-shifting is k/2.

4. The method as claimed in claim 1, wherein if the retransmission request is an odd order retransmission request, the prescribed number of bits for cyclic-shifting is 1.

5. A method for retransmitting a coded bit stream in a transmission apparatus for a Code Division Multiple Access ("CDMA") mobile communication system having an encoder for generating a coded bit stream with error correcting bits by receiving a data bit stream, and a high-order modulator for sequentially mapping the coded bit stream to symbols each having a fixed reliability pattern, the method comprising:

controlling cyclic shift on the coded bit stream to be retransmitted according to a predetermined cyclic shift pattern to change the coded bit stream based on the number of retransmission requests;

storing the coded bit stream to be retransmitted and cyclic-shifting a coded bit stream to be retransmitted by a prescribed number of bits according to the cyclic shift pattern, at a retransmission request; and sequentially mapping the cyclic-shifted coded bit stream to be retransmitted to a fixed reliability pattern on a bit-by-bit basis.

6. The method as claimed in claim 5, wherein the cyclic-shifting comprises:

cyclic-shifting the coded bit stream to be retransmitted by the prescribed number of bits, when the retransmission request is an odd order retransmission request; and outputting the coded bit stream to be retransmitted without cyclic-shifting, when the retransmission request is an even order retransmission request.

7. The method as claimed in claim 6, wherein the prescribed number of bits is a half of a total number of coded bits that can be sequentially mapped to one symbol according to the fixed reliability pattern.

8. The method as claimed in claim 6, wherein the prescribed number of bits is 1.

9. A transmission apparatus for a Code Division Multiple Access CDMA ("CDMA") mobile communication system having an encoder for generating a coded bit stream with error correcting bits by receiving a data bit stream, an interleaver for interleaving the coded bit stream and generating an interleaved coded bit stream, and a $2^k$-ary modulator for modulating k×N coded bits in the coded bit stream into N symbols each comprised of k bits, each symbol being comprised of a first bit part with higher reliability and a second bit part with lower reliability, the apparatus comprising:

a shifter intervening between an interleaver and a modulator, for cyclic-shifting first k/2 coded bits among k×N coded bits to a rear part of the k×N coded bits, at a retransmission request for the k×N coded bits;

a $2^k$-ary modulator for sequentially dividing the cyclic-shifted k×N coded bits by k/2 bits;

alternately arranging the divided coded bits in the first bit part and the second bit part, each part having N symbols each comprised of k bits; and a transmitter for transmitting the arranged divided coded bits.

10. The transmission apparatus as claimed in claim 9, wherein if the retransmission request is an even order retransmission request, the coded bits are output without delay.

11. A transmission apparatus for a Code Division Multiple Access ("CDMA") mobile communication system having an encoder for generating a coded bit stream with error correcting bits by receiving a data bit stream, and a high-order modulator for sequentially mapping the coded bit stream to symbols each having a fixed reliability pattern, the apparatus comprising:

a buffer controller for controlling cyclic shift on a coded bit stream to be retransmitted according to a predetermined cyclic shift pattern to change the coded bit stream based on a number of retransmission requests, at a retransmission request;

a shifter for storing the coded bit stream to be retransmitted, and cyclic-shifting the coded bit stream to be retransmitted by a prescribed number of bits according to the predetermined cyclic shift pattern from the buffer controller; and a modulator for sequentially mapping the cyclic-shifted coded bit stream to be retransmitted to a fixed reliability pattern on a bit-by-bit basis.

12. The transmission apparatus as claimed in claim 11, wherein the cyclic shift pattern comprises:

cyclic-shifting the coded bit stream to be retransmitted by the prescribed, number of bits, when the retransmission request is an odd order retransmission request; and outputting the coded bit stream to be retransmitted without cyclic-shifting, when the retransmission request is an even order retransmission request.

13. The transmission apparatus as claimed in claim 12, wherein the prescribed number of bits is a half of a total number of coded bits that can be sequentially mapped to one symbol according to the fixed reliability pattern.

14. The transmission apparatus as claimed in claim 12, wherein the prescribed number of bits is 1.

15. A method for receiving data in which a bit stream comprised of at least 3 bits represents one symbol and includes a first bit part with higher reliability and a second bit part with lower reliability, in a reception apparatus for a Code Division Multiple Access ("CDMA") mobile communication system, the method comprising:

demodulating coded bits existing in the first bit part and coded bits existing in the second bit part and outputting one coded bit stream, at retransmission;

cyclic-shifting the demodulated coded bit stream by a prescribed number of bits and rearranging the demodulated coded bit stream;

combining coded bits constituting the rearranged coded bit stream with coded bits constituting a coded bit stream received at initial transmission and previous retransmission; and transmitting a retransmission request according to whether errors have occurred in information bits decoded from the combined coded bits.

16. The method as claimed in claim 15, wherein the cyclic-shifting and rearranging comprises:

cyclic-shifting the coded bit stream to be retransmitted by the prescribed number of bits, when the retransmission request is an odd order retransmission request; and outputting the coded bit stream to be retransmitted without cyclic-shifting, when the retransmission request is an even order retransmission request.

17. The method as claimed in claim 16, wherein the prescribed number of bits is a half of a total number of coded bits that can be sequentially mapped to one symbol.

18. The method as claimed in claim 16, wherein the prescribed number of bits is 1.

19. A reception apparatus for receiving data in which a bit stream comprised of at least 3 bits represents one symbol and includes a first bit part with higher reliability and a second bit part with lower reliability, in a reception apparatus for a Code Division Multiple Access ("CDMA") mobile communication system, the apparatus comprising:

a demodulator for demodulating received data and outputting one coded bit stream;

a buffer controller for controlling cyclic shift on the demodulated coded bit stream according to a predetermined cyclic shift pattern to change the coded bit stream based on a number of retransmission requests, at retransmission; and a rearrangement part for storing the demodulated coded bit stream, and rearranging the demodulated coded bit stream through cyclic shift on the demodulated coded bit stream by a prescribed number of bits according to the predetermined cyclic shift pattern from the buffer controller.

20. The reception apparatus as claimed in claim 19, wherein the buffer controller further cyclic-shifts the coded bit stream to be retransmitted by the prescribed number of bits, when the retransmission request is an odd order retransmission request, and outputs the coded bit stream to be retransmitted without cyclic-shifting, when the retransmission request is an even order retransmission request.

21. The reception apparatus as claimed in claim 20, wherein the prescribed number of bits is a half of a total number of coded bits that can be sequentially mapped to one symbol according to a fixed reliability pattern.

22. The reception apparatus as claimed in claim 20, wherein the prescribed number of bits is 1.

23. A modulation method for data transmission in a mobile communication system, comprising the steps of:

encoding data bits to produce coded bits by a determined coding rate;

rate matching the coded bits to produce rate matched bits;

exchanging parts of the rate matched bits in one modulation symbol and modulating the exchanged bits in accordance with a modulation scheme to produce a modulation symbol; and transmitting the modulation symbol, wherein the one modulation symbol consists of a first part having a relatively high reliability and a second part having a relatively low reliability.

24. The method of claim 23, wherein the exchanging step is performed by cyclic shifting the rate matched bits in one modulation symbol.

25. The method of claim 23, wherein the exchanging step is performed when there is a retransmission request.

26. The method of claim 23, further comprising:

channel interleaving the rate matched bits to prohibit burst error of transmission data.

27. The method of claim 23, wherein the modulation scheme is one of 16QAM (Quadrature Amplitude Modulation) and 64QAM.

28. A system for data transmission, comprising:

an encoder to encode data bits to produce coded bits by a determined coding rate;

a rate matcher to rate match the coded bits to produce rate matched bits;

a modulator to exchange parts of the rate matched bits in one modulation symbol and modulate the exchanged bits in accordance with a modulation scheme to produce a modulation symbol; and a transmitter to transmit the modulation symbol, wherein the one modulation symbol consists of a first part having a relatively high reliability and a second part having a relatively low reliability.

29. The method of claim 28, wherein the modulator exchanges the rate matched bits in one modulation symbol by cyclic shifting.

30. The system of claim 28, wherein the modulator exchanges the parts of the rate matched bits when there is a retransmission request.

31. The system of claim 28, further comprising a channel interleaver to channel interleave the rate matched bits to prohibit burst error of transmission data.

32. The system of claim 28, wherein the modulation scheme is one of 16QAM (Quadrature Amplitude Modulation) and 64QAM.

* * * * *